GEORGE A. STARKWEATHER, OF WAYMART, PENNSYLVANIA.

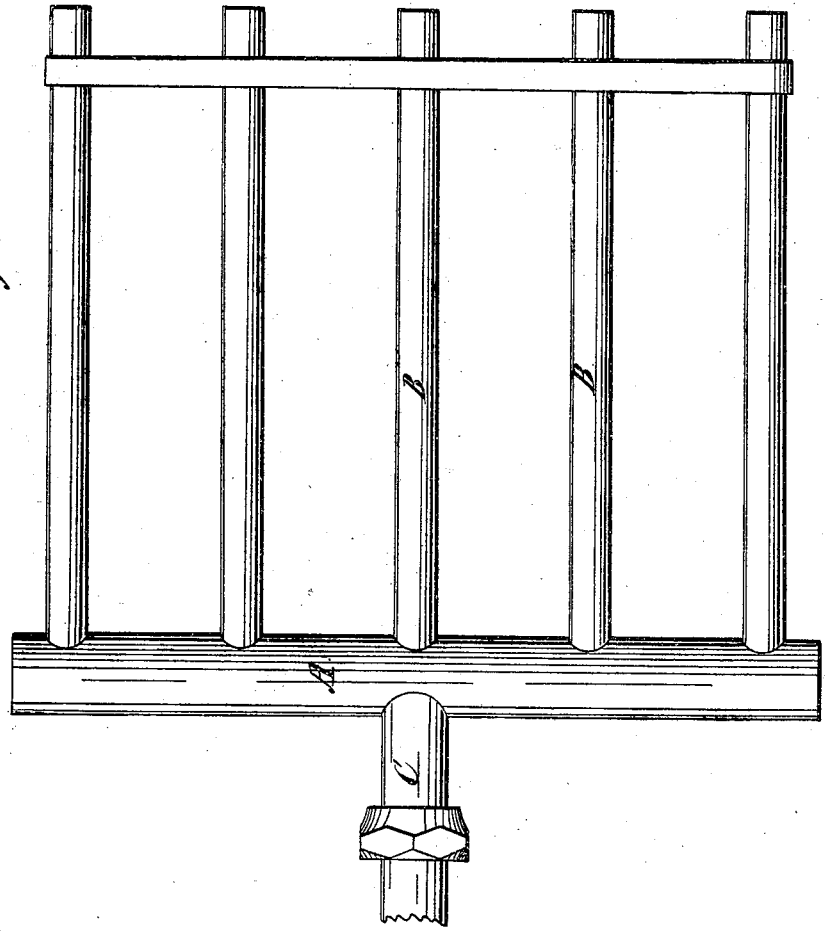

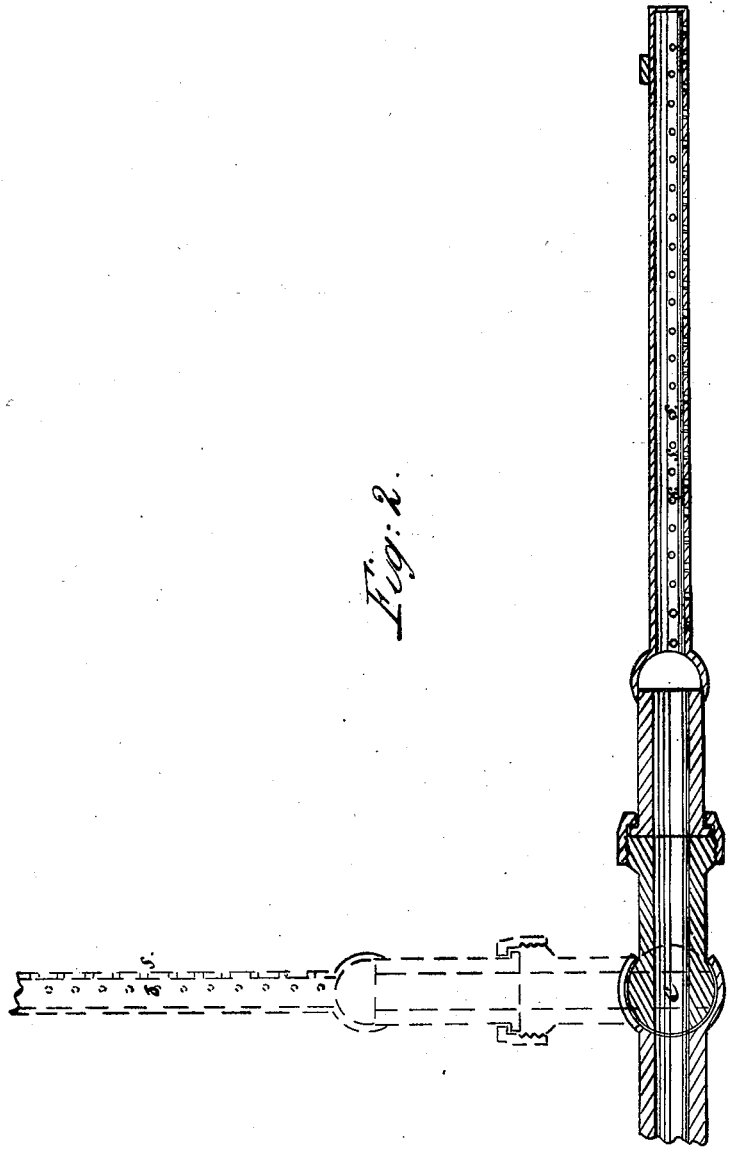

Letters Patent No. 87,984, dated March 16, 1869.

IMPROVED APPARATUS FOR LEACHING BARK AND OTHER MATERIALS.

The Schedule referred to in these Letters Patent and making part of the same.

*To all whom it may concern:*

Be it known that I, GEORGE A. STARKWEATHER, of Waymart, Wayne county, and State of Pennsylvania, have invented a new and useful Injecting Leaching-Machine for leaching bark, plants, &c.; and I do hereby declare that the following is a full and exact description thereof, reference being had to the accompanying drawings, and to the letters of reference marked thereon.

The nature of my invention consists in hollow tubes extending over the leach or tub, with punctures, or holes on and along the bottom and under sides of said tubes, or distributers, so that there will be continuous streams of hot or cold water, or liquor, mulching or wetting the whole surface of bark, or other material, in said leach or tub, at one and the same time.

These tubes or distributers run or extend into a larger tube at equal distances. This larger tube or reservoir must be of sufficient size to supply the smaller tubes or distributers. This larger tube or feeder has one or more connecting-pipes, with couplings, so arranged that it can be easily connected with the feeding-pipes or troughs through which said tan-liquor or mulching-material passes before entering into the injecting leaching-machine. These pipes or troughs connect with a reservoir of heated or cold liquor, or both, or with a box, made of three-inch plank, sixteen inches wide, and said box to be made about three feet in height, with an exhaust-steam pipe, or a direct-steam pipe, or both, running into said box, or heater, about fifteen inches under the water or liquor in said box to be heated.

In the mouth of the receiving-pipe, or at some other convenient place, I place a strainer-cloth, of copper wire, or of some other material, through which this heated or cold liquor or water should pass, to take out the sediment and other impurities before passing into the injecting leaching-machine.

To enable others who are skilled in the art to make and use my invention, I will proceed to describe its construction and operation.

I construct my injecting leaching-machine with copper tubes, or any other material that will stand tan-liquor without corroding, to suit all shapes and sizes of leaches or tubs.

The reservoir-tube, marked A, I make of the width or length of the leaches, and three inches diameter, more or less, according to head and amount desired to pass through.

The injecting-tubes or distributers, that run into this tube, marked A, I make one inch and one-fourth diameter, more or less, as required, with punctures on the under sides and bottom, so that with five or more, placed at equal distances in said tube A, and running over the top of leach, they will mulch or wet the whole surface at one and the same time, and continue the same till the leach is full, or till you have obtained the desired result.

These smaller tubes, marked B in the draught, are supported by two or more cross-rods, which can be set on legs, or rest on the leach, as desired.

The larger tube, marked A, has one or more tubes, with couplings, that can be easily connected with other tubes that are placed in the logs, tubes or troughs at suitable distance, so that this injecting leaching-machine can be disconnected and placed over another leach, and again coupled with another tube or tubes, placed in said logs, tubes, or troughs, and so continue to shift said injecting leaching-machine over all the leaches.

The pipe, with coupling, marked C, should be of three-inch bore, more or less, so as to keep tube A full.

The strainer-cloth I place in the heating-box, where the heated liquor or water discharges, to pass into the pipes or conductors that feed the injecting leaching-machine.

For the purpose of removing the injector out of the way, I affix a ball-and-socket joint in the pipe leading to the reservoir-tube, as shown at c on fig. 2.

This device enables the operator to turn the injector upward from the leach at will, and at the same time prevent the liquid from flowing into the reservoir-tube.

When necessary, I attach suitable strainers in the mechanism leading to the reservoir-tube, in the rear of the ball-and-socket joint, to prevent particles of matter from passing to the apertures in tubes B, and destroying the same.

The apertures last named are marked s on the drawings, and they consist in small perforations through the lower sides of said tubes, respectively of the form and arrangement shown on fig. 2, the object being to secure a uniform distribution of the liquid and steam over the surface of the entire leach at one and the same time.

What I claim as my invention, and desire to secure by Letters Patent, is—

The combination and arrangement of the devices herein shown and described, consisting of the conducting-pipe C, the distributing-tubes B, with their apertures s and the joint c, constructed and operating substantially as and for the purposes specified.

GEO. A. STARKWEATHER.

Witnesses:
  C. CARR,
  F. V. CARR.